3,461,202
COMPOSITION AND PROCESS
Homer L. Robson, Hamden, Conn., and Roy H. Hodges, Welling, England, assignors to Olin Mathieson Chemical Corporation
Filed July 28, 1966, Ser. No. 568,380
Int. Cl. C02b *1/36;* A61l *13/00*
U.S. Cl. 424—149            6 Claims

ABSTRACT OF THE DISCLOSURE

Available chlorine in a body of water is stabilized against the decomposing action of sunlight by adding to the body of water suitable amounts of cerium ion and a sequestrant therefor.

---

This invention relates to a new and effective treatment for the sanitation of swimming pool water. The method consists of stabilizing free available chlorine against the decomposing action of sunlight by adding to the pool water a cerium salt and a suitable sequestrant.

Free available chlorine, which is appropriately introduced into aqueous bodies by means of liquid or gaseous chlorine or hypochlorites, is the form of available chlorine most effective in sanitizing. Combined available chlorine in the simple chloramines, $NH_2Cl$ and $NHCl_2$ are used as sanitizing agents but are much less effective. Monochloramine is stable to sunlight but dichloramine is not. The more complex chloramines such as the N-dichlorodimethylhydantoins, N-chloroisocyanurates and the N-chlorosulfamates are more stable than free chlorine and are of intermediate effectiveness as sanitizing agents.

Free available chlorine reacts with and removes ammonia from pool water forming monochloramine, $NH_2Cl$. Other nitrogenous materials form other chloramines. Dichloramine and nitrogen trichloride are formed mostly at pH levels lower than usually recommended for swimming pools, for example pH 4.5 to 7.0. These materials are irritating to the eyes and mucous membranes of swimmers. A pH level of 7.4 to 7.6, which largely eliminates the dichloramine, is commonly recommended, and levels of 7.4 to 8.4 are used by most pools. The higher pH levels are generally found more comfortable and gentler on eyes, although more available chlorine is required with them.

In public swimming pools, the high bather load consumes most of the available chlorine. In private pools and in semi-private pools, such as those associated with motels, the bather load is commonly light and the free available chlorine is lost principally by the action of sunlight. On sunny days the available chlorine, normally carried in sufficient excess, is reduced to ineffective levels in as little as six hours. This loss is frequently several times the loss caused by the bather load on the pool and it occurs even when the pool is not used. Loss of free available chlorine is an inconvenience and a serious expense because available chlorine must be added to compensate for that destroyed by sunlight. Frequently, this amount is impossible to estimate, not knowing the hours or intensity of the sunshine. Tests are necessary to determine the remaining available chlorine in the pool and the correct additional amount to be added to bring the chlorine protection to an adequate level.

Stabilizers have been added to reduce losses of available chlorine due to sunlight. Cyanuric acid, sulfamic acid and certain substituted acrylates reduce the loss due to sunshine to a minor factor in comparison with the loss of available chlorine due to the bather load.

Cyanuric acid, added to a swimming pool, quickly reacts with free available chlorine to form N-chloroisocyanuric acid or its salts. These N-chloro compounds do not absorb in the ultraviolet region and are not decomposed by sunlight. Sulfamic acid forms N-chloro sulfamates which have less absorption of ultraviolet light than free hypochlorite and reduce the loss of available chlorine by sunlight. The amount of hypochlorite remaining in the pool depends on the concentration of available chlorine, pH and concentration of stabilizer. About 40 parts per million of cyanuric acid or of sulfamic acid stabilize 0.5 to 2 p.p.m. of available chlorine in the pool from the effects of sunlight.

The N-chloroisocyanurates and the N-chlorosulfamates are both less effective bactericides than the same amount of free available chlorine but substantial excess available chlorine maintains bactericidal action. Control of algae in swimming pools requires more free available chlorine. At pH 7.5, about 0.6 p.p.m. of free available chlorine is required to repress completely the growth of algae. In pools stabilized with cyanuric acid, from 1.0 to 1.2 parts per million of available chlorine are required to give algae control. With sulfamic acid as the stabilizer, 2 to 4 parts per million of available chlorine are required.

When previously known stabilizers are used, "break point chlorination" to eliminate extraneous impurities, for example, perspiration, urea, insects and dust from the pool is much less effective. Substantial amounts of such nitrogenous materials encourage algae growth.

The cleanest water, free of bacteria, algae and other contaminants is provided using free available chlorine, avoiding known stabilizers. However, larger amounts of chlorine or hypochlorite are required to replace sunlight losses than in stabilized pools.

According to the present invention, aqueous compositions containing 0.1 to 10 parts per million of free available chlorine are stabilized against decomposition by sunlight by including in such compositions from 5 to 50 parts per part of free available chlorine of cerium, introduced suitably in the form of a salt of the rare earth element and a sequestrant in an amount effective to maintain the rare earth salt in aqueous solution at a pH of 7 to 8.4. Novel compositions for carrying out the method when added to the body of water containing free available chlorine consist essentially of a salt cerium and a sequestrant in an amount effective to maintain the rare earth salt in aqueous solution at a pH of 7 to 8.4.

Cerium salts are particularly advantageous and preferred for the practice of this invention. Cerium salts are the cheapest of the rare earth salts and they are known to be relatively non-toxic and safe. They are effective to prolong the life of available chlorine. Salts of same of the other rare earth elements may be suitable but cerium is outstanding and preferred. Of the salts of cerium, those stable to hypochlorites are preferred. The chloride is especially advantageous in this respect and the sulfates and nitrates are also suitably stable. The chlorides and sulfates are preferred to the nitrates and phosphates since the latter provide food for algae. Oxalates are poisonous and oxalates and tartrates react with hypochlorites. They are useful only when a sufficient excess of available chlorine is present in the water to convert these salts to more stable salts. Oxides are usually readily obtainable and are preferably treated with an acid, for example, muriatic acid or other forms of hydrochloric acid to convert them to stable salts prior to use according to this invention. Cerous salts are suitable provided sufficient available chlorine is present to oxidize the cerium to the ceric state and to maintain the desired level of free available chlorine.

The amount of the cerium salt is appropriately sufficient to provide 5 to 50 parts of the rare earth metal cation per part of free available chlorine. A particularly useful amount of cerium ion to add to a swimming pool is about 25 p.p.m. which extends the life of the hypochlorite from 5 to 20 fold.

At very low pH values in sulfuric or perchloric acid solutions, ceric (IV) ions oxidize chloride ion to free chlorine. However, at pH levels above 4, chlorine or hypochlorite solutions quantitatively oxidize cerous (III) ion to ceric. The ceric ion tends to form insoluble compounds, particularly the oxide and hydroxide which are of very low solubility. To maintain the ceric ion in solution, the ceric ion is complexed with a suitable sequestrant.

Particularly useful sequestrants include the polyphosphates, for example, sodium tripolyphosphate, tetrasodium pyrophosphate and sodium polymetaphosphates. Organic sequestrants, including ethylenediamine tetraacetic acid (EDTA), diethylenetriamine pentaacetic acid (DTPA), triethylenetetramine hexaacetic acid and nitrilotriacetic acid and their salts are also useful for this sequestration and smaller proportions are sufficient compared with the polyphosphates. Also useful are the phosphonic acid compounds described in British Patents 1,021,017 and 1,021,018. DTPA is especially effective in the presence of considerable concentrations of calcium ion. Many of the organic sequestrants supplied to the trade contain impurities which consume appreciable amounts of available chlorine. A suitable excess of available chlorine is appropriately supplied with such sequestrants to satisfy their chlorine demand. Satisfactory available chlorine levels then can be maintained in swimming pools. Alternatively, purified forms of these sequestrants are preferred.

Ceric ions alone are not adequate as bactericides or for algae control. Their sanitizing action is far below that of free available chlorine. Some organic contaminants are oxidized by ceric ions, but a far too slow a rate to be suitable for swimming pool sanitation. The amount of sequestrant is appropriately from 0.5 to 10 parts per part of the rare earth metal salt. From 1 to 5 parts per part are usually sufficient and preferred.

Analytical determination of ceric ions in the presence of available chlorine is best carried out potentiometrically. Ceric ion interferes with the standard ortho tolidine test in acid solution for available chlorine. Even in the Palin "neutral ortho tolidine" test, part of the ceric ion titrates as available chlorine. By the addition of buffers to maintain a pH of 3, the immediate color corresponds approximately to the free available chlorine while the color due to ceric ion and chloramines develops more slowly. These results are sufficiently accurate for swimming pool control.

EXAMPLE I

A xenon arc lamp of 6,000 watts capacity was equipped with filters so that the radiation, at a distance of 15 inches above a circulating body of water was similar to that of sunshine at noon at the equator on a clear day. This provides conditions more severe than usually encountered in the United States. Under these conditions, the decomposition of free available chlorine was similar to that effected by sunlight in a swimming pool four feet deep. In 2 hours, the free available chlorine was reduced from 1 p.p.m. to 0.2 p.p.m.

A mixture was prepared by grinding together 1.25 parts by weight of granular, low density sodium tripolyphosphate and one part of cerous chloride heptahydrate. About 0.14 g. of this mixture per liter was added to water containing 1.0 p.p.m. of available chlorine, adding 25 p.p.m. of cerium to the water This water was irradiated as before. The available chlorine was reduced to 0.2 p.p.m. in 20 hours. This is a ten-fold increase in the time the strength of the available chlorine is maintained sufficient to protect swimming pool water.

EXAMPLE II

A mixture was made by grinding together 1.5 parts by weight of sodium tripolyphosphate and 1 part of heptahydrated cerous chloride. The mixture gave a clear solution when added to water containing 2.0 p.p.m. of free available chlorine to make 25 p.p.m. of cerium. This water was irradiated as described in Example I for 20 hours to reduce the free available chlorine to 0.2 p.p.m. In the absence of cerium, the same irradiation reduced the free available chlorine from 2.0 to 0.2 p.p.m. in 2.75 hours. In each case the water was buffered at a pH of 7.5 throughout the test.

EXAMPLE III

One part by weight of the mixture prepared in Example II was mixed with two parts of flake salt, and this composition was finely ground. When added to soft water, this mixture dissolved readily with no caking or lumping. It was similarly effective in stabilizing free available chlorine when tested as described in Example I.

EXAMPLE IV

One part by weight of the mixture prepared in Example II was blended with four parts of sodium tripolyphosphate and finely ground. This mixture was added to a water of 180 hardness with slow stirring to provide 25 p.p.m. cerium. When tested as described in Example I, it was similarly effective in stabilizing free available chlorine.

EXAMPLE V

Equal parts by weight of the disodium salt of ethylenediamine tetraacetic acid and cerous chloride heptahydrate were finely ground together. Added to distilled water in amounts sufficient to give 25 to 100 p.p.m. cerium, this mixture produced a clear solution. When tested as described in Example I, it was similarly effective in stabilizing free available chlorine.

EXAMPLE VI

Equal parts by weight of the disodium salt of nitrilotriacetic acid and cerous chloride hydrate were finely ground together. When sufficient of this mix was added to distilled water to give from 25 to 100 p.p.m. cerium, a clear solution was obtained, with no tendency toward lump formation. When tested as described in Example I, it was similarly effective in stabilizing free available chlorine.

EXAMPLE VII

An aqueous solution was prepared containing 400 p.p.m. of calcium hardness, 1 p.p.m. of available chlorine, 25 p.p.m. of ceric ion and 100 p.p.m. of diethylenetriamine pentaacetic acid (DTPA). Caustic was added to bring the pH to 7.5. The available chlorine was stabilized as in previous examples and the DTPA was effective to maintain the cerium ion in solution even in the presence of high calcium hardness.

What is claimed is:
1. Method of stabilizing 0.1 to 10 parts per million of free available chlorine in an aqueous medium against decomposition by sunlight which comprises dissolving in said aqueous medium (1) from 5 to 50 parts of cerium ion per part of free available chlorine and (2) from 0.5 to 10 parts of a sequestrant per part of cerium ion, said sequestrant effective to maintain said cerium ion in aqueous solution at a pH of 7 to 8.4.

2. Method as claimed in claim 1 wherein said sequestrant is a polyphosphate.

3. Method as claimed in claim 2 wherein said polyphosphate is sodium tripolyphosphate.

4. Method is claimed in claim 1 wherein said sequestrant is ethylenediamine tetraacetic acid.

5. Method as claimed in claim 1 wherein said sequestrant is nitrilo-triacetic acid.

6. Method as claimed in claim 1 wherein said sequestrant is diethylenetriamine pentaacetic acid.

References Cited

UNITED STATES PATENTS

| 2,988,471 | 6/1961 | Fuchs et al. | |
| 3,170,883 | 2/1965 | Owen et al. | 252—187 |
| 3,253,979 | 5/1966 | Robson | 167—17 |
| 3,330,766 | 7/1967 | Goldwasser | 252—99 |

OTHER REFERENCES

Sequestrene Glegy Chemicals, 1952, (page 19 relied on).

MAYER WEINBLATT, Primary Examiner

U.S. Cl. X.R.

202—187; 210—62; 252—99